(12) United States Patent
Guarneri et al.

(10) Patent No.: US 11,848,006 B2
(45) Date of Patent: Dec. 19, 2023

(54) METHOD OF SWITCHING A CIRCUIT FROM AN IDLE STATE TO AN ACTIVE STATE BASED ON A TRIGGER SIGNAL FROM AM ALWAYS-ON CIRCUIT

(71) Applicant: STMicroelectronics S.r.l., Agrate Brianza (IT)

(72) Inventors: Nunziata Ivana Guarneri, Caltanissetta (IT); Filippo Naccari, Tremestieri Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 159 days.

(21) Appl. No.: 17/000,892

(22) Filed: Aug. 24, 2020

(65) Prior Publication Data

US 2021/0065688 A1 Mar. 4, 2021

(30) Foreign Application Priority Data

Sep. 3, 2019 (IT) .......................... 102019000015506

(51) Int. Cl.
| | | |
|---|---|---|
| *G10L 15/08* | (2006.01) | |
| *G10L 15/04* | (2013.01) | |
| *G10L 15/16* | (2006.01) | |
| *G10L 25/24* | (2013.01) | |
| *G10L 15/22* | (2006.01) | |

(52) U.S. Cl.
CPC ............ *G10L 15/083* (2013.01); *G10L 15/04* (2013.01); *G10L 15/16* (2013.01); *G10L 15/22* (2013.01); *G10L 25/24* (2013.01); *G10L 2015/088* (2013.01)

(58) Field of Classification Search
CPC ....... G10L 15/083; G10L 15/04; G10L 15/16; G10L 15/22; G10L 2015/088; G10L 15/063; G10L 25/24; H04R 1/08
See application file for complete search history.

(56) References Cited

U.S. PATENT DOCUMENTS

| | | | |
|---|---|---|---|
| 7,835,910 B1 | 11/2010 | Hakkani-Tur et al. | |
| 9,378,733 B1 * | 6/2016 | Vanhoucke | ............. G10L 15/08 |
| 10,304,475 B1 | 5/2019 | Wang et al. | |

(Continued)

OTHER PUBLICATIONS

S. Lecoq, J. Le Bellego, A. Gonzalez, B. Larras and A. Frappé, "Low-complexity feature extraction unit for "Wake-on-Feature" speech processing," 2018 25th IEEE International Conference on Electronics, Circuits and Systems (ICECS), 2018, pp. 677-680, doi: 10.1109/ICECS.2018.8617967. (Year: 2018).*

(Continued)

*Primary Examiner* — Bhavesh M Mehta
*Assistant Examiner* — Nandini Subramani
(74) *Attorney, Agent, or Firm* — Slater Matsil, LLP

(57) ABSTRACT

A method of processing an electrical signal transduced from a voice signal is disclosed. A classification model is applied to the electrical signal to produce a classification indicator. The classification model has been trained using an augmented training dataset. The electrical signal is classified as either one of a first class and a second class in a binary classification. The classifying being performed is a function of the classification indicator. A trigger signal is provided to a user circuit as a result of the electrical signal being classified in the first class of the binary classification.

24 Claims, 1 Drawing Sheet

(56) References Cited

U.S. PATENT DOCUMENTS

| | | | |
|---|---|---|---|
| 10,847,137 B1* | 11/2020 | Mandal | G10L 15/16 |
| 2017/0040016 A1* | 2/2017 | Cui | G10L 15/02 |
| 2017/0125020 A1* | 5/2017 | Seo | G10L 15/16 |
| 2018/0233130 A1* | 8/2018 | Kaskari | G06N 3/084 |
| 2018/0350347 A1* | 12/2018 | Fukuda | G10L 21/003 |
| 2021/0055778 A1* | 2/2021 | Myer | G06N 3/045 |

OTHER PUBLICATIONS

S. Lecoq, et.al., "Low-complexity feature extraction unit for "Wake-on-Feature" speech processing," 2018 25th IEEE International Conference on Electronics, Circuits and Systems (ICECS), 2018, pp. 677-680 (Year: 2018).*

M. Price et al., "A Low-Power Speech Recognizer and Voice Activity Detector Using Deep Neural Networks," in IEEE Journal of Solid-State Circuits, vol. 53, No. 1, pp. 66-75, Jan. 2018 (Year: 2018).*

Zhang, Yundong, et al., "Hello Edge: Keyword Spotting on Microcontrollers", arXiv:1711.07128v3, Feb. 14, 2018, 14 pages.

* cited by examiner

METHOD OF SWITCHING A CIRCUIT FROM AN IDLE STATE TO AN ACTIVE STATE BASED ON A TRIGGER SIGNAL FROM AM ALWAYS-ON CIRCUIT

CROSS-REFERENCE TO RELATED APPLICATIONS

This application claims priority to Italian Patent Application No. 102019000015506, filed on Sep. 3, 2019, which application is hereby incorporated herein by reference.

TECHNICAL FIELD

The present disclosure relates to a generally to method and system for processing an electric signal transduced from a voice signal.

BACKGROUND

An Internet-of-Things (IoT) infrastructure may include a network of environmentally distributed interconnected electronic devices (e.g., wireless sensors) which can interact both with the physical world and one another, for instance via an Internet connection (e.g., forming a wireless sensor network or WSN).

Ideally, a suitable electronic device to be used in such a network of interconnected devices or IoT end-nodes should be autonomous, for instance either in terms of functionality, energy, network connectivity and possibly low-cost. In the perspective of implementing a pervasive network of autonomous devices, an IoT end-node may be powered by batteries (or energy harvesters). Depending on the application environment, the battery recharge or replacement may be prevented for hard accessibility or, however, should occur with a low frequency to keep the maintenance costs contained (e.g., once every one or more years). In this context, it is therefore essential to target a power-optimized design at the device level to guarantee a long duration of the battery according to the provided specification. This also includes the implementation of aggressive power savings techniques to avoid any kind of energy waste within the system.

Straightforward energy saving may be obtained by constraining node functionalities, which presents the drawback of performance and quality degradation.

In order to save energy an IoT Smart node may be kept in a fully-active state only for a short time. During the rest of the period, the node can be put in (deep) sleep mode, where only a minimal part of the system, namely the always-on region, may remain active to trigger the "wakeup" or activation of the rest of the system. In this state, the system consumes a power which is several orders of magnitude lower than the active power. This power consumption has to be kept as low as possible to gain an extended battery life.

A possible strategy to reduce power consumption may include so-called "keyword-spotting" processing used for enabling speech-based user interactions with "smart" electronics devices. Using an audio sensor IoT node, the always-on circuit portion may be configured to apply speech processing to audio-signals for identification of a keyword in utterances. The idle portion of the circuit may be activated as a result of detecting a specific keyword, for instance "Hello".

Since KWS is "always on" and may run on a micro-controller unit, it should have very low power, memory and computational requirements. On the other hand, the KWS system should detect the keyword with high accuracy and low latency, to provide a real time user experience.

A majority of processing engines for speech recognition may deploy a combination of embedded recognition to trigger cloud-based recognition, where phrases or keywords detected may be used to start a connection to a cloud server which may operate the full speech recognition, increasing the process latency.

One of the most useful contributions to reach high KWS performances may be the introduction of a Voice Activity Detector (VAD) positioned at the beginning of the entire processing pipeline. Such a VAD may discriminate between "voice" and "not voice" sounds. Many types of VAD may be used, some based on simple check of audio signal energy, other, more sophisticated, are based on neural networks.

Simple VADs may not provide suitable levels of discrimination, while highly performing VAD may use many computational resources. Moreover, highly performing VAD may employ dedicated neural network architectures which may be heavy from a computational point of view.

SUMMARY

The disclosure relates to a method of processing an electric signal transduced from a voice signal, corresponding electronic device, connected network of electronic devices and computer program product. For example, embodiments relate to an energy-efficient audio signal processing method for detecting or spotting keywords configured to trigger human-machine interaction with one or more electronic devices, e.g., smartphone devices, Internet-of-Things (IoT) end-nodes.

One or more embodiments may be applied to micro-controller units or other processing devices having memory-constrained limits.

One or more embodiments can contribute in providing an improved solution.

An audio signal processing method for keyword spotting and configured to run on the IoT-edge, facilitating latency reduction and accuracy increase may be exemplary of such a method.

One or more embodiments may relate to a corresponding device.

A sensor device equipped with processing circuitry configured to perform operations of the method as per the present disclosure may be exemplary of such a device.

One or more embodiments may relate to a corresponding apparatus, for instance an IoT network including a plurality of sensor devices as per the present disclosure.

One or more embodiments may comprise a computer program product loadable in the memory of at least one processing circuit (e.g., a computer) and comprising software code portions for executing the steps of the method when the product is run on at least one processing circuit. As used herein, reference to such a computer program product is understood as being equivalent to reference to computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may facilitate providing a power-optimized IoT node equipped with a key-word spotting always-on audio-sensing circuit portion.

One or more embodiments may advantageously facilitate reducing the average power of the always-on circuitry constantly kept in a running state and reducing the latency related to the system activation rate, facilitating reaching a real time performance.

One or more embodiments may advantageously process incoming audio signals with the same method using for training the classifier, hence reducing the number and complexity of classifier models used to perform voice activity detection and inference.

One or more embodiments may present and increased robustness, facilitating performing KWS even in highly noisy environments.

One or more embodiments may facilitate detecting and recognizing keywords event in a continuous flow of a voice steaming.

One or more embodiments may facilitate discriminating voice/not voice sounds to perform keyword spotting using a single neural network architecture. Consequently, one or more embodiments may advantageously reduce computational burden of a processing pipeline, e.g., cloud-based speech recognition, activatable as a function of the spotted keyword.

One or more embodiments may comprise augmented labelling processing, facilitating handling different pronunciation speed of a same keyword to detect (for instance, slow or fast pronounce of the word).

One or more embodiments may facilitate detecting the transition between one word and another, wherein starting and ending parts of the word may be a critical parameter in keyword spotting.

One or more embodiments may facilitate handling language tone and pronunciation variations, which can be very different if the same word is pronounced by an Italian, Asian, French or English, etc., person.

One or more embodiments may include a redundancy check performed on a set of consecutive classification results. In one or more embodiments, handling successive inferences may facilitate to have a robust output, less sensitive to noise.

BRIEF DESCRIPTION OF THE DRAWINGS

One or more embodiments will now be described, by way of non-limiting example only, with reference to the annexed Figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

The drawings are in simplified form and are not to precise scale. For the sake of simplicity, directional (up/down, etc.) or motional (forward/back, etc.) terms may be used with respect to the drawings. The term "couple" and similar terms do not necessarily denote direct and immediate connections, but also include connections through intermediate elements or devices.

Figure 1:
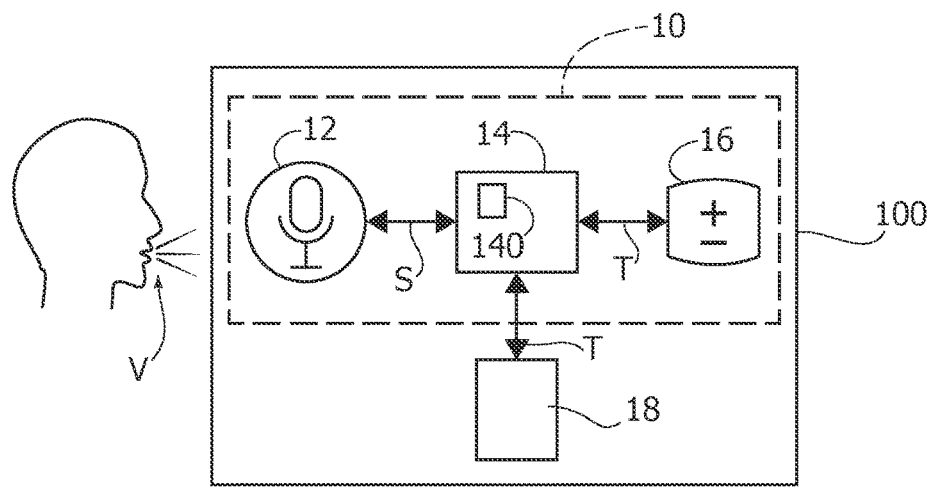
FIG. 1 is a diagram exemplary of a device as per the present disclosure.

FIG. 1 is exemplary of an electronic device wo having a so-called always-on circuit portion 10 and an idle circuit portion 18. The always-on circuit portion 10 may be configured to process detected audio signals and provide a trigger signal T to "wake-up" the idle circuit portion using a method 20 as discussed in the following (for instance with reference to FIGS. 2 and 3). The idle portion 18 may be configured to remain in an idle state unless it receives the trigger signal T from the always-on portion 10, wherein the idle portion 18 may become active, for instance activating an Internet connection as a result of receiving such trigger signal T.

In one or more embodiments, such an always-on circuit portion 10 may comprise audio detecting circuitry 12, for instance a micro-phone configured to transduce audio signals V such as, for instance, a voice audio signal emitted by a human, to corresponding electric signals S. The portion 10 may also comprise processing circuitry 14, for instance a processing unit of a micro-controller and power supply circuitry 16, for instance a battery or energy harvesting circuitry, coupled to the processing circuitry 14 and to the voice sensor 12 as well as couplable to the idle portion 18 of the electronic device as a result of receiving a trigger signal (T) from the processing circuitry 14 in the always-on portion 10 of the device 100.

In one or more embodiments, the always-on circuit portion 10 may comprise an edge platform microcontroller unit processing circuitry 14. For instance, a STM32L4@80 MHz microcontroller and a single microphone 12 of the STile family sampling audio signals at a rate of 16 kiloHertz, both by STMicroelectronics, may be employed.

In one or more embodiments, a microphone embedded in a smart phone may be used and the electronic device 100 may be a smart phone device.

In one or more embodiments, processing circuitry 14 may comprise a memory circuit block 140 configured to store data related to processing a detected voice signal V. Specifically, the memory circuit block 140 may store training data D, D' for processing, as discussed in the following.

Figure 2:
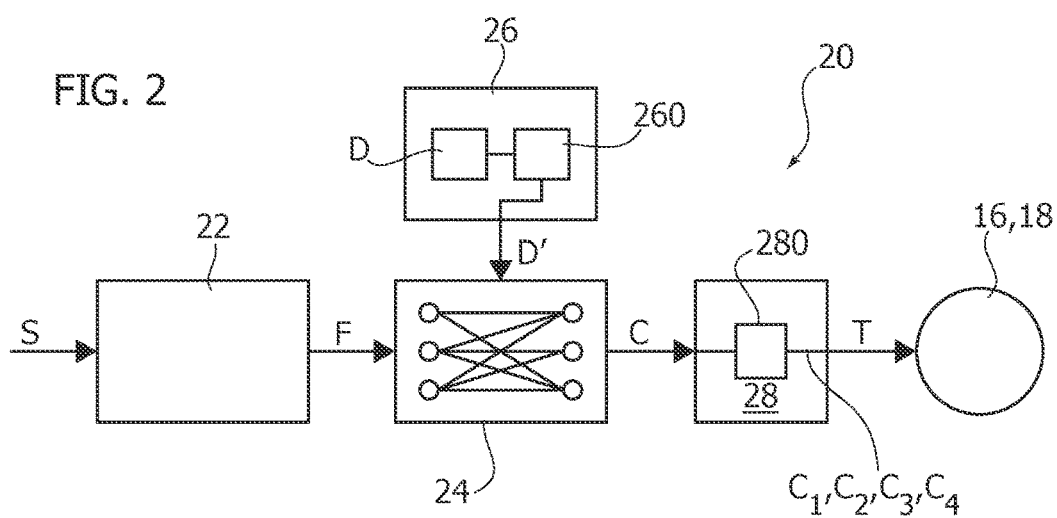
FIG. 2 is a diagram exemplary of a method as per the present disclosure.

In one or more embodiments as exemplified in FIG. 2, a data processing pipeline 20 may comprise a pre-processing stage 22, a classification processing stage 24, and a post-processing stage 28. The pre-processing stage 22 is configured to receive audio-signal S transduced by the microphone 12 and to apply feature extraction processing thereto, for instance including Mel-frequency cepstrum coefficients (MFCC) computing, producing a set of features F as a result.

The classification processing stage 24 comprises an artificial neural network processing model which may be provided trained in a dedicated training stage 26 as discussed in the following. The post-processing stage 28 is configured to collect classification data output by the classification processing stage 24 and to apply further processing thereto, providing a trigger signal T for the power supply circuitry 16 and/or the second circuit portion 18 as a function of classification labels output by the classification processing stage 24.

Recent audio devices may be equipped with more than one microphone, so it may be possible to perform front-end algorithms as the beamforming or the source localization.

In one or more embodiments, the proposed system may advantageously use solely one microphone audio-transducer 12, e.g., without using front-end algorithms. One or more embodiments may facilitate working with limited memory and power consumption, facilitating simplification, for instance avoiding noise cancellation or automatic gain control methods to be applied to the audio streaming.

The ANN training stage 24 may comprise a supervised training stage and a training dataset D, for instance selectable among one (or more) corpus (corpora) which may be stored in the memory circuit block 140.

A speech corpus (or spoken corpus) may comprise a database of speech audio files and text transcriptions. In speech technology, speech corpora are used, among other things, to create acoustic models (which can then be used with a speech recognition engine).

Exemplary corpora may include TIMIT Acoustic-Phonetic Continuous Speech Corpus (LDC93S1) or Google Commands Dataset, the latter including 65000 one-second long utterances of 30 short words, pronounced by thousands of different people.

An ideal corpus may comprise a transcribed large dataset, which may be very hard to obtain and/or very costly. Labelling augmentation, as discussed in the following, may facilitate overcoming such limitations.

In one or more embodiments, the corpus may comprise a set of audio recordings of single words having a specific length in time, for instance a first recording S may have a first full-time length ts.

In one or more embodiments, such a corpus may comprise an Isolated Words Dataset which may comprise a small sized public audio files dataset, e.g., 2476 audio files with each file having a one second time-length, each audio file of the dataset comprising a recording of a single word, e.g., the word "Marvin." For instance, such an Isolated Words Dataset may be expanded by including therein, in addition to the public audio files dataset, further recordings of the same word, e.g., "Marvin."

In one or more embodiments, such audio files in the audio files dataset having one second time-length each may be indicated as having "weak labelling" or "binary labelling", indicating that only a portion of the audio file comprising the word is labelled, e.g., having a label "1" attached thereto, while other noises or sounds recorded in the audio-file are not labelled or labelled with a "not Marvin" label, e.g., having a label "0" attached thereto. At the same time, for instance, when the word "Marvin" begins or ends exactly in the time-length of the audio file may be unknown.

Figure 3:
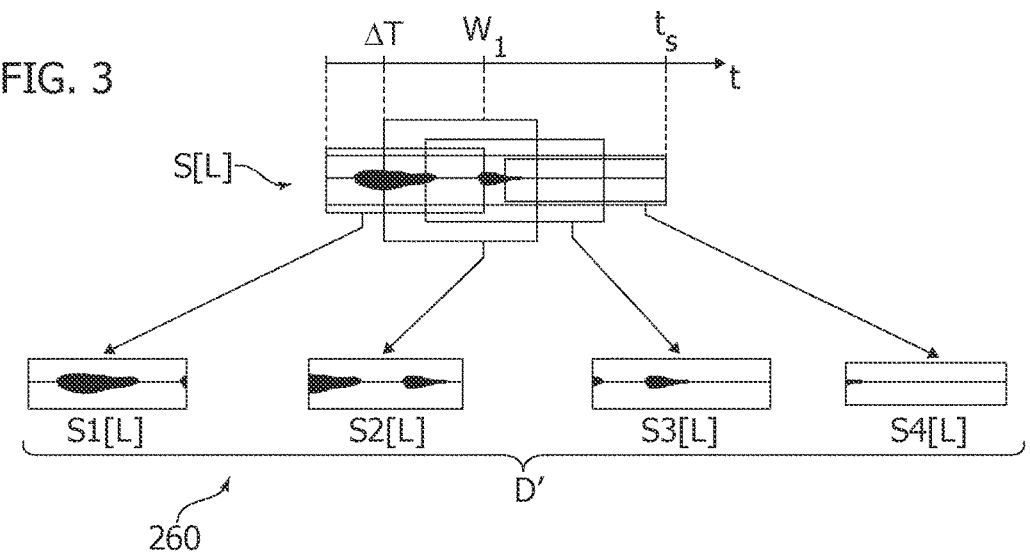
FIG. 3 comprises possible time diagrams of audio signals exemplary of details of the method of FIG. 2.

In one or more embodiments, supervised training may comprise applying labelling augmentation 260 to the training dataset D, as exemplified in FIG. 3.

A single audio-signal data recording, specifically a single "word" audio-signal S in the training database D may be labeled with a label L, for instance the first recording S in a first corpus may be labeled as belonging to the "keyword" category.

Label augmentation processing may be particularly advantageous when using an Isolated Words Dataset as discussed in the foregoing.

For instance, before providing the labeled data recording S audio file in the audio file dataset to the artificial neural network processing stage 24 for training, the first record S may be augmented as a result of augmentation processing.

For the sake of simplicity, in the following an exemplary case of an augmentation factor of four is discussed, being otherwise understood that such a value is purely exemplary and in no way limiting.

In one or more embodiments, augmentation processing (or augmented labelling) 260 as exemplified in FIG. 3 may comprise splitting the first recording S in time thereby providing a set of recording chunks or segments S1, S2, S3, S4. Any segment S1 in the set of segments S1, S2, S3, S4 may have a shorter segment time length than a full-time length of the first recording S, for instance, a first segment time-length $\omega 1 < ts$, and wherein the segments may share common portions, partially overlapping each other.

Any segment in the produced set of segments is labeled with the same first label L of the first recording S, so that any segment S1 in the set of segments S1, S2, S3, S4 may inherit the label L of the original "mother" audio segment S from which it was split, producing an augmented training dataset D'. Such augmented training dataset D' is provided to the artificial neural network 24 for training 26 a model 24 to recognize between keyword/not keyword word classification with improved accuracy and precision, e.g., facilitating to spot the keyword from the very beginning.

For instance, splitting or chunking the first recording S may comprise sliding, with a discrete time step $\Delta t$, a fixed-sized time window mask, for instance having size $\omega 1$, onto the first recording S audio signal, and producing a first segment S1 equal to a chunk of the first signal S of the length col of the fixed-sized time window mask. For instance, the discrete time step $\Delta t$ used to slide the fixed-sized time window mask may have a value selected so as to produce overlapping sliding window, producing segments which may share common data samples, for instance in the case where $\omega 1 > \Delta t > 0$.

In one or more embodiments, such an augmented labelling processing 260 process may increase robustness of the artificial neural network training phase and learning to discriminate between keyword/not keyword.

In one or more embodiments, the artificial neural network processing stage 24 may comprise a multi-layer perceptron ANN architecture.

A multi-layer perceptron, briefly MLP, artificial neural network may comprise an input layer, at least one hidden layer and an output layer, the MLP ANN having a number of parallel perceptrons n1, n2, . . . , nO, for each respective layer. The perceptrons in the layers are coupled to the input node of each neuron of the downstream layer (which may be referred to as a "fully connected feed forward" topology) and to a bias input node. For instance, the input layer may receive an input array of values together with a bias input value, e.g., +1.

The learning or training stage 26 may facilitate the minimization of an error function.

In one or more embodiments, other types of ANN processing may be used and trained for use as discussed in the foregoing, being otherwise understood that the discussed exemplary MLP case is in no way limiting.

In one or more embodiments, the ANN processing stage 24 may thus receive signal features F and output a classification C, for instance a numeric value between 0 and 1 indicative of the probability that the detected audio-signal S includes a spoken word belonging to either one of two categories: "keyword" or "not keyword".

In one or more embodiments, the post-processing stage 28 may comprise a transfer function, e.g., a step function, to provide as an output an indicator, which, for instance, may facilitate evaluating whether the previously calculated classification C numeric value (or a combination thereof) is below or above a threshold value T, e.g., T=0.5.

One or more embodiments may include a redundancy check performed on a set of consecutive classification results. Specifically, in one or more embodiments the post-processing stage may collect 280 a number of classification results C1, C2, C3, C4, for instance a number of collected classification results C1, C2, C3, C4 equal to the value of the augmentation factor used to produce the augmented training dataset D'. In one or more embodiments, handling successive inferences in such a way 28 may facilitate to have a robust output, e.g., insensitive to noise.

For instance, this may be the result of taking into account the way the ANN model was trained while deploying it for inference. In one or more embodiments, the output of the post-processing stage 28 may be a triggering «wake up» signal to be provided to the idle circuit portion solely if multiple successive recognitions of the "keyword" category are provided by the ANN.

In one or more embodiments, the electronic device 100 having processing circuitry 14 configured to operate according to a method as exemplified in FIG. 2 may be comprised in a network of interconnected electronic devices, for instance a wireless IoT sensor network, wherein the activatable second circuit portion may comprise other sensors in the network.

One or more embodiments may comprise a method (for instance, 20) of processing an electrical signal (for instance, S) transduced (for instance, 12) from a voice signal (for instance, V). A classification model (for instance, 24) can be applied to the electrical signal to produce at least one classification indicator (for instance, C). The classification model is trained (for instance, 26) using an augmented training dataset (for instance, 260, D'), The electrical signal is classified, as a function of the at least one classification indicator, to either one of a first class and a second class in a binary classification (for instance, 28). A trigger signal (for instance, T) is provided to at least one user circuit (for instance, 16, 18) as a result of the electrical signal being classified in the first class of the binary classification.

One or more embodiments may comprise providing a first training dataset (for instance, D) including a set of labelled voice recordings (for instance, S[L]) having respective labels (for instance, L) and finite time-lengths (for instance, ts), augmenting (for instance, 260) the first training dataset (for instance, D) and providing an augmented training dataset (for instance, D') as a result of the augmenting (for instance, 260), and training the classification model with the augmented training dataset.

In one or more embodiments, augmenting the first training dataset may comprise segmenting at least one labelled voice recording in the set of labelled voice recordings into a set of recording segments (for instance, S1, S2, S3, S4) as a function of an augmentation factor, wherein the recording segments (for instance, S1) in the set of recording segments have a time-length (for instance, ω1) shorter than a respective time-length of the at least one labelled voice recording, and labelling recording segments resulting from the segmenting with a label (for instance, L) equal to the label of the labelled voice recording from which the recording segments were segmented.

In one or more embodiments, the recording segments in the set of recording segments may comprise at least one pair of recording segments partially overlapping over time.

In one or more embodiments, applying classification processing (for instance, 22, 24) to the transduced voice signal may comprise applying feature extraction processing (for instance, 22) to the signal (for instance, S).

In one or more embodiments, feature extraction processing may comprise computing Mel-frequency cepstrum coefficients (MFCC).

In one or more embodiments, applying classification processing to the transduced voice signal may include applying artificial neural network (ANN) processing, preferably a multi-layer perceptron (MLP) processing.

In one or more embodiments, determining a binary classification (for instance, 28) based on the at least one classification indicator (for instance, C) produced, comprises collecting (for instance, 280) a set of classification indicators (for instance, C1, C2, C3, C4), and producing a triggering signal (for instance, T) as a result of the collected classification indicators (for instance, C1, C2, C3, C4) having a same first value.

One or more embodiments may comprise an electronic device (for instance, 100) configured to operate with the method of one or more embodiments. Processing circuitry (for instance, 10, 14) is configured to receive the electrical signal (for instance, S), apply thereto the classification model (for instance, 24) to classify the electrical signal and produce the trigger signal (for instance, T) as a result of the electrical signal (for instance, S) being classified in the first class of the binary classification (for instance, 28). The at least one user circuit (for instance, 16, 18) coupled to the processing circuitry (for instance, 10, 14) to receive the trigger signal (for instance, T) therefrom.

In one or more embodiments, the at least one user circuit (for instance, 16, 18) may be switchable from a first, idle state to a second, active state as a result of receiving the trigger signal (for instance, T) from the processing circuitry (for instance, 10, 14).

In one or more embodiments, the electronic device may comprise a mobile communication device, preferably a smart phone.

One or more embodiments comprise a connected network of electronic devices, wherein at least one electronic device in the network of electronic devices may include an electronic device (for instance, 100) according to one or more embodiments.

One or more embodiments may comprise a computer program product loadable in the memory of at least processing circuit and including software code portions implementing the method according to one or more embodiments when run on the processing circuit (for instance, 14).

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A method of processing an electrical signal transduced from a voice signal, the method comprising:
applying, at an always-on circuit of an electronic device, a classification model to the electrical signal to produce a classification indicator, wherein the classification model comprises a classification model trained using an augmented training dataset comprising a set of augmented labeled voice recordings derived from an initial set of labeled voice recordings of an initial training dataset, each of the augmented labeled voice recordings sharing a common portion with at least one other augmented labeled voice recording, wherein the set of augmented labeled voice recordings is greater than the initial set of labeled voice recordings by an augmentation factor of at least two;
providing the initial training dataset including the initial set of labeled voice recordings having respective labels and finite time lengths;
augmenting the initial training dataset to provide the augmented training dataset, wherein augmenting the initial training dataset comprises:
segmenting each initial labeled voice recording in the initial set of labeled voice recordings into a set of recording segments as a function of the augmentation factor, wherein each of the recording segments in the set of recording segments has a time length shorter than the time length of the corresponding initial labeled voice recording, and
labeling recording segments resulting from the segmenting with the same label as the label of the labeled voice recording from which the recording segments were segmented;
training the classification model with the augmented training dataset;
classifying, at the always-on circuit of the electronic device, the electrical signal to either one of a first class and a second class in a binary classification, the classifying being performed as a function of the classification indicator;
providing, at the always-on circuit of the electronic device, a trigger signal to a user circuit of the electronic device as a result of the electrical signal being classified in the first class of the binary classification, the always-on circuit and the user circuit being part of the electronic device; and
switching the user circuit from an idle state to an active state in response to receiving the trigger signal at the user circuit.

2. The method of claim 1, wherein applying the classification model to the electrical signal comprises applying feature extraction processing to the electrical signal.

3. The method of claim 2, wherein the feature extraction processing comprises computing Mel-frequency cepstrum coefficients.

4. The method of claim 1, wherein applying the classification model to the electrical signal includes applying artificial neural network processing.

5. The method of claim 1, wherein applying the classification model to the electrical signal includes applying a multi-layer perceptron processing.

6. The method of claim 1, wherein classifying the electrical signal comprises collecting a set of classification indicators, wherein providing the trigger signal comprises producing the triggering signal as a result of the collected set of classification indicators having the same first value.

7. The method of claim 1, wherein switching the user circuit from the idle state to the active state comprises activating a communication link between the electronic device and an external network device.

8. The method of claim 1, further comprising receiving the electrical signal transduced at a single microphone.

9. The method of claim 1, wherein segmenting each labeled voice recording in the initial set of labeled voice recordings comprises:
sliding a fixed-time window mask with a discrete time step onto each labeled voice recording to produce corresponding recording segments that are partially overlapping in time, a size of the discrete time step being less than a size of the fixed-time window mask.

10. An electronic device comprising:
processing circuitry configured to:
receive an electrical signal transduced from a voice signal;
apply a classification model to the electrical signal to produce a classification indicator, wherein the classification model comprises a classification model trained using an augmented training dataset comprising a set of augmented labeled voice recordings derived from an initial set of labeled voice recordings of an initial training dataset, each of the augmented labeled voice recordings sharing a common portion with at least one other augmented labeled voice recording, wherein the set of augmented labeled voice recordings is greater than the initial set of labeled voice recordings by an augmentation factor of at least two;
provide the initial training dataset including the initial set of labeled voice recordings having respective labels and finite time lengths;
augment the initial training dataset to provide the augmented training dataset, wherein augmenting the initial training dataset comprises:
segment each initial labeled voice recording in the initial set of labeled voice recordings into a set of recording segments as a function of the augmentation factor, wherein each of the recording segments in the set of recording segments has a time length shorter than the time length of the corresponding initial labeled voice recording, and
label recording segments resulting from the segmenting with the same label as the label of the labeled voice recording from which the recording segments were segmented;
train the classification model with the augmented training dataset;
classify the electrical signal to either one of a first class and a second class in a binary classification, the classification being a function of the classification indicator; and
generate a trigger signal as a result of the electrical signal being classified in the first class of the binary classification; and
a user circuit coupled to the processing circuitry to receive the trigger signal therefrom, the user circuit configured to remain in an idle state and switchable from the idle state to an active state in response to receiving the trigger signal from the processing circuitry.

11. The electronic device of claim 10, comprising a transducer configured to transduce the voice signal into the electrical signal.

12. The electronic device of claim 10, wherein the electrical signal is classified by applying feature extraction processing to the electrical signal.

13. The electronic device of claim 10, wherein the electrical signal is classified by applying artificial neural network processing.

14. The electronic device of claim 10, wherein the electrical signal is classified by applying a multi-layer perceptron processing.

15. The electronic device of claim 10, wherein the electronic device comprises a mobile communication device.

16. A connected network of electronic devices that includes the electronic device of claim 10.

17. The electronic device of claim 10, wherein the user circuit is configured to establish a communication link between the electronic device and an external network device after switching to the active state.

18. The electronic device of claim 10, wherein to segment each labeled voice recording in the initial set of labeled voice recordings comprises sliding a fixed-time window mask with a discrete time step onto each labeled voice recording to produce corresponding recording segments that are partially overlapping in time, a size of the discrete time step being less than a size of the fixed-time window mask.

19. A non-transitory computer-readable storage medium storing a computer program for execution by a processing circuit, the computer program comprising software code portions to cause the processing circuit to:
apply, at an always-on circuit of an electronic device, a classification model to an electrical signal transduced from a voice signal to produce a classification indicator, wherein the classification model comprises a classification model trained using an augmented training dataset comprising a set of augmented labeled voice recordings derived from an initial set of labeled voice recordings of an initial training dataset, each of the augmented labeled voice recordings sharing a common portion with at least one other augmented labeled voice recording, wherein the set of augmented labeled voice recordings is greater than the initial set of labelled voice recordings by an augmentation factor of at least two;
provide the initial training dataset including the initial set of labeled voice recordings having respective labels and finite time lengths;
augment the initial training dataset to provide the augmented training dataset wherein augmenting the initial training dataset comprises:
segment each initial labeled voice recording in the initial set of labeled voice recordings into a set of recording segments as a function of the augmentation factor, wherein each of the recording segments in the set of recording segments has a time length shorter than the time length of the corresponding initial labeled voice recording, and
label recording segments resulting from the segmenting with the same label as the label of the labeled voice recording from which the recording segments were segmented; and
train the classification model with the augmented training dataset;
classify, at the always-on circuit of an electronic device, the electrical signal to either one of a first class and a second class in a binary classification, the classifying being performed as a function of the classification indicator; and
provide, at the always-on circuit of an electronic device, a trigger signal to a user circuit as a result of the electrical signal being classified in the first class of the binary classification, the always-on circuit and the user circuit being part of the electronic device, the user circuit being configured to switch from an idle state to an active state in response to receiving the trigger signal at the user circuit.

20. The non-transitory computer-readable storage medium of claim 19, wherein the software code portions to segment each labeled voice recording in the initial set of labeled voice recordings comprises software code portions to:
slide a fixed-time window mask with a discrete time step onto each labeled voice recording to produce corresponding recording segments that are partially overlapping in time, a size of the discrete time step being less than a size of the fixed-time window mask.

21. The non-transitory computer-readable storage medium of claim 19, wherein switching the user circuit from the idle state to the active state comprises activating a communication link between the electronic device and an external network device.

22. The non-transitory computer-readable storage medium of claim 19, wherein applying the classification model to the electrical signal includes applying artificial neural network processing.

23. A method of processing an electrical signal transduced from a voice signal, the method comprising:
applying, at an always-on circuit of an electronic device, a classification model to the electrical signal to produce a classification indicator, wherein the classification model comprises a classification model trained using an augmented training dataset from an initial training dataset, wherein an augmented labeled voice recording in the augmented training data set has a common portion with at least one other augmented labeled labelled voice recording in the augmented training data set;
training, at the always-on circuit of the electronic device, the classification model using the augmented training dataset, the augmented training dataset being generated by applying labeling augmentation to a training dataset stored in a memory circuit of the always-on circuit, the training dataset comprising a speech corpus comprising a set of audio recordings of single words having a specific length in time;
providing the initial training dataset including an initial set of labeled voice recordings having respective labels and finite time lengths;
augmenting the initial training dataset to provide the augmented training dataset, wherein augmenting the initial training dataset comprises:
segmenting each initial labeled voice recording in the initial set of labeled voice recordings into a set of recording segments, wherein each of the recording segments in the set of recording segments has a time length shorter than the time length of the corresponding initial labeled voice recording, and
labeling recording segments resulting from the segmenting with the same label as the label of the labeled voice recording from which the recording segments were segmented;

training the classification model with the augmented training dataset;

classifying, at the always-on circuit of the electronic device, the electrical signal to either one of a first class and a second class in a binary classification, the classifying being performed as a function of the classification indicator; and providing, at the always-on circuit of the electronic device, a trigger signal to a user circuit as a result of the electrical signal being classified in the first class of the binary classification.

24. The method of claim 23, wherein segmenting each initial labeled voice recording comprises sliding a fixed-time window mask with a discrete time step onto each labeled voice recording to produce corresponding recording segments that are partially overlapping in time, a size of the discrete time step being less than a size of the fixed-time window mask.

* * * * *

UNITED STATES PATENT AND TRADEMARK OFFICE
CERTIFICATE OF CORRECTION

| | | |
|---|---|---|
| PATENT NO. | : 11,848,006 B2 | Page 1 of 1 |
| APPLICATION NO. | : 17/000892 | |
| DATED | : December 19, 2023 | |
| INVENTOR(S) | : Guarneri et al. | |

It is certified that error appears in the above-identified patent and that said Letters Patent is hereby corrected as shown below:

On the Title Page

Item (54), in Column 1, in "Title", Line 4, delete "AM" and insert -- AN --.

In the Specification

In Column 1, Line 4, delete "AM" and insert -- AN --.

In the Claims

In Column 12, in Claim 23, Line 42, before "voice" delete "labelled".

Signed and Sealed this
Twenty-second Day of October, 2024

*Katherine Kelly Vidal*

Katherine Kelly Vidal
*Director of the United States Patent and Trademark Office*